United States Patent
Buechi et al.

(10) Patent No.: US 9,240,600 B2
(45) Date of Patent: *Jan. 19, 2016

(54) METHOD FOR LIMITING THE OUTPUT VOLTAGE OF A PEM FUEL CELL SYSTEM

(75) Inventors: Felix Buechi, Langenthal (CH); Marcel Hofer, Villmergen (CH)

(73) Assignee: BELENOS CLEAN POWER HOLDING AG, Bienne (CH)

( * ) Notice: Subject to any disclaimer, the term of this patent is extended or adjusted under 35 U.S.C. 154(b) by 809 days.

This patent is subject to a terminal disclaimer.

(21) Appl. No.: 12/991,862
(22) PCT Filed: May 5, 2009
(86) PCT No.: PCT/EP2009/055383
§ 371 (c)(1), (2), (4) Date: Nov. 9, 2010
(87) PCT Pub. No.: WO2009/144118
PCT Pub. Date: Dec. 3, 2009

(65) Prior Publication Data
US 2011/0059375 A1 Mar. 10, 2011

(30) Foreign Application Priority Data
May 9, 2008 (EP) .................................... 08156002

(51) Int. Cl.
H01M 8/06 (2006.01)
H01M 8/04 (2006.01)
(Continued)

(52) U.S. Cl.
CPC ........ H01M 8/04089 (2013.01); H01M 8/0488 (2013.01); H01M 8/04104 (2013.01);
(Continued)

(58) Field of Classification Search
CPC .......... H01M 8/0438; H01M 8/04089; H01M 8/04104; H01M 8/04398; H01M 8/04753; H01M 8/04761

USPC ........................................................ 429/415
See application file for complete search history.

(56) References Cited

U.S. PATENT DOCUMENTS

2002/0034669 A1 3/2002 Kobayashi et al.
2003/0022043 A1 1/2003 McElroy
(Continued)

FOREIGN PATENT DOCUMENTS

EP 2 017 916 A 1/2009
FR 2 873 498 A 1/2006

OTHER PUBLICATIONS

International Search Report issued in corresponding application No. PCT/EP2009/055383, completed Aug. 24, 2009 and mailed Sep. 3, 2009.

(Continued)

*Primary Examiner* — Nicholas P D'Aniello
(74) *Attorney, Agent, or Firm* — Griffin and Szipl PC

(57) ABSTRACT

The method for limiting the output voltage of a PEM fuel cell system operating in, or near, zero load conditions, in such a way as to minimize degradation of performance over time, comprises:
supplying a hydrogen stream to the anode of the fuel cell;
supplying an oxygen stream to the cathode of the fuel cell;
monitoring an output voltage of the fuel cell;
monitoring a hydrogen pressure in the fuel cell;
monitoring an oxygen pressure in the fuel cell;
limiting the hydrogen stream and the oxygen stream while actuating controllable recirculating pumps for the hydrogen and the oxygen in such a way as to bring and maintain the hydrogen and oxygen pressures below 1 $bar_{absolute}$ while maintaining the hydrogen pressure between 70 and 130% of the oxygen pressure, so that the output voltage remains below 0.90 volts.

9 Claims, 3 Drawing Sheets

(51) Int. Cl.
  *H01M 16/00* (2006.01)
  *H01M 8/10* (2006.01)
(52) U.S. Cl.
  CPC ...... *H01M8/04388* (2013.01); *H01M 8/04395* (2013.01); *H01M 8/04559* (2013.01); *H01M 8/04753* (2013.01); *H01M 8/04761* (2013.01); *H01M 16/006* (2013.01); *H01M 8/04097* (2013.01); *H01M 2008/1095* (2013.01); *Y02E 60/50* (2013.01)

(56) References Cited

U.S. PATENT DOCUMENTS

| | | | |
|---|---|---|---|
| 2003/0035986 A1* | 2/2003 | Yang | 429/25 |
| 2003/0044658 A1 | 3/2003 | Hochgraf | |
| 2003/0118876 A1 | 6/2003 | Sugiura et al. | |
| 2007/0048591 A1 | 3/2007 | Dong et al. | |
| 2007/0065711 A1 | 3/2007 | Gopal | |
| 2008/0311439 A1* | 12/2008 | Paganelli | 429/13 |

OTHER PUBLICATIONS

International Preliminary Report on Patentability issued in corresponding application No. PCT/EP2009/055383, completed May 26, 2010.

Office Action issued in co-pending related U.S. Appl. No. 12/943,829 on Feb. 27. 2013.

David Heeley, Understanding Pressure and Pressure Measurement, Freescale Semiconductor Application Note, May 2005.

Pressure Measurement, Wikipedia, http://en.wikipedia.org/wiki/Pressure_measurement (downloaded May 13, 2013).

* cited by examiner

METHOD FOR LIMITING THE OUTPUT VOLTAGE OF A PEM FUEL CELL SYSTEM

This is a National Phase Application in the United States of International Patent Application No. PCT/EP2009/055383 filed May 5, 2009, which claims priority on European Patent Application No. 08156002.1, filed May 9, 2008. The entire disclosures of the above patent applications are hereby incorporated by reference.

FIELD OF THE INVENTION

The present invention concerns a method for limiting the output voltage of a PEM fuel cell system operating in, or near, zero load conditions, in such a way as to minimize degradation of performance over time. The invention more particularly concerns such a method wherein the fuel cell system is of a type designed to use hydrogen as fuel and pure oxygen as oxidizer and wherein the system comprises a controllable hydrogen recirculating pump and a controllable oxygen recirculating pump.

BACKGROUND OF THE INVENTION

Electrochemical fuel cells of the above-mentioned type convert reactants, namely a stream of hydrogen and a stream of oxygen, into electric power and water. Proton exchange membrane fuel cells (PEMFC) generally comprise a solid polymer electrolyte membrane disposed between two porous electrically conductive electrode layers so as to form a membrane electrode assembly (MEA). In order to induce the desired electrochemical reaction, the anode electrode and the cathode electrode each comprise one or more catalyst. These catalysts are typically disposed at the membrane/electrode layer interface.

At the anode, the hydrogen moves through the porous electrode layer and is oxidized by the catalyst to produce protons and electrons. The protons migrate through the solid polymer electrolyte towards the cathode. The oxygen, for its part, moves through the porous cathode and reacts with the protons coming through the membrane at the cathode electrocatalyst. The electrons travel from the anode to the cathode through an external circuit, producing an electrical current.

FIG. 1 illustrates, in exploded view, a prior art proton exchange membrane fuel cell stack 10. Stack 10 includes a pair of end plate assemblies 15, 20 and a plurality of fuel cell assemblies 25. In this particular example, electrically insulating tie rods 30 extend between end plate assemblies 15, 20 to retain and secure stack assembly 10 in its assembled state with fastening nuts 32. Springs 34 threaded on tie rods 30 interposed between fastening nuts 32 and end plate 20 apply resilient compressive force to stack 10 in the longitudinal direction. Reactant and coolant fluid streams are supplied to, and exhausted from, internal manifolds and passages in stack 10 via inlet and outlet ports (not shown) in end plate 15.

Each fuel cell assembly 25 includes an anode flow field plate 35, a cathode flow field plate 40 and an MEA 45 interposed between plates 35 and 40. Anode and cathode flow field plates 35 and 40 are made out of an electrically conductive material and act as current collectors. As the anode flow field plate of one cell sits back to back with the cathode flow field plate of the neighboring cell, electric current can flow from one cell to the other and thus trough the entire stack 10. Other prior art fuel cell stacks are known in which individual cells are separated by a single bipolar flow field plate instead of by separate anode and cathode flow field plates.

Flow field plates 35 and 40 further provide a fluid barrier between adjacent fuel cell assemblies so as to keep reactant fluid supplied to the anode of one cell from contaminating reactant fluid supplied to the cathode of another cell. At the interface between MEA 45 and plates 35 and 40, fluid flow fields 50 direct the reactant fluids to the electrodes. Fluid flow field 50 typically comprises a plurality of fluid flow channels formed in the major surfaces of plates 35 and 40 facing MEA 45. One purpose of fluid flow field 50 is to distribute the reactant fluid to the entire surface of the respective electrodes, namely the anode on the hydrogen side and the cathode on the oxygen side.

One known problem with PEMFCs is the progressive degradation of performance over time. Actually, long-term operation of solid polymer fuel cells has been proven, but only under relatively ideal conditions. In contrast, when the fuel cell has to operate in a wide range of conditions, as is the case for automotive applications in particular, the ever-changing conditions (often modeled as load cycling and start-stop cycles), have been shown to reduce durability and lifespan drastically.

Different types of non-ideal conditions have been identified in the literature. A first of these conditions is referred to as "high cell voltage"; it is known that exposing a fuel cell to low or zero current conditions, leads to higher degradation rates in comparison to operation at an average constant current. A second non-ideal condition is "low cell voltage"; it is further known that drawing a peak current from the fuel cell also leads to increased degradation rates. It follows from the above that, in order to preserve the lifespan of a fuel cell, it is preferable to avoid both "high cell voltage" and "low cell voltage" operating conditions. In other words, the fuel cell should be operated only in a limited voltage range.

In order the cope with the abrupt changes in load that are typical of automotive applications, an electrochemical energy storage unit, such as a battery or a super capacitor, is usually associated with the fuel cell. The battery can work as a buffer: supplying electric power when there is a peak in the load and, conversely, storing excess electric power in case of low or zero load conditions. In principle, such an arrangement allows operating the fuel cell in the desired limited voltage range. However, once the battery is completely charged, it obviously ceases to be available for storing the excess electric power supplied by the fuel cell. A known solution to this last problem is simply to shut down the fuel cell until the level of charge of the battery reaches a lower threshold. However, start-stop cycles also contribute to the degradation of performance over time.

SUMMARY OF THE INVENTION

It is accordingly an object of the present invention to provide a method for operating a fuel cell in associated with an electrochemical energy storage unit in the desired limited voltage range without having to shut down and restart the fuel cell whenever the electrochemical energy storage unit is full.

The method of the present invention is defined by the appended claim 1.

According to the present invention, limiting the hydrogen and oxygen streams supplied to the fuel cell while actuating the hydrogen and oxygen recirculating pumps makes it possible to keep the output voltage below a predetermined maximum limit. According to the invention, the maximum limit is 0.90 volts or less. Furthermore, one will understand that by maintaining the hydrogen pressure between 70 and 130% of the oxygen pressure, the method of the invention avoids large pressure differences across the membrane of the fuel cell and, in the particular case of higher hydrogen pressure, avoids fuel starvation at the anode.

One advantage of the present invention is that regulating the output power by controlling the pressure allows to connect the fuel cell stack directly to an electrochemical energy storage unit without the need some kind of power management unit to adapt voltages.

Preferably, the method of the invention maintains the output voltage of the fuel cell between 0.70 and 0.85 volts.

According to a particular implementation of the method of the invention, the pressure of the oxygen supplied to the fuel cell is kept in the range between 0.2 and 1.0 $\text{bar}_{absolute}$. Preferably between 0.5 and 1 $\text{bar}_{absolute}$.

When an energy storage unit is used in association with the fuel cell, the method of the present invention allows to avoid completely charging the energy storage unit, while keeping the output voltage of the fuel cell in the desired range.

According to a particularly favorable implementation of the method of the invention, a fuel cell system can be operated in zero load condition, that is to say at zero net output power, in idling state, while the average cell voltage remains in the range between 0.65 and 0.90 volts by reducing the pressure of at least one of the reactants below 0.7 $\text{bar}_{absolute}$.

BRIEF DESCRIPTION OF THE DRAWINGS

Other features and advantages of the present invention will appear upon reading the following description, given solely by way of non-limiting example with reference to the annexed drawings, in which.

DETAILED DESCRIPTION OF THE ILLUSTRATIVE EMBODIMENTS

Figure 1:
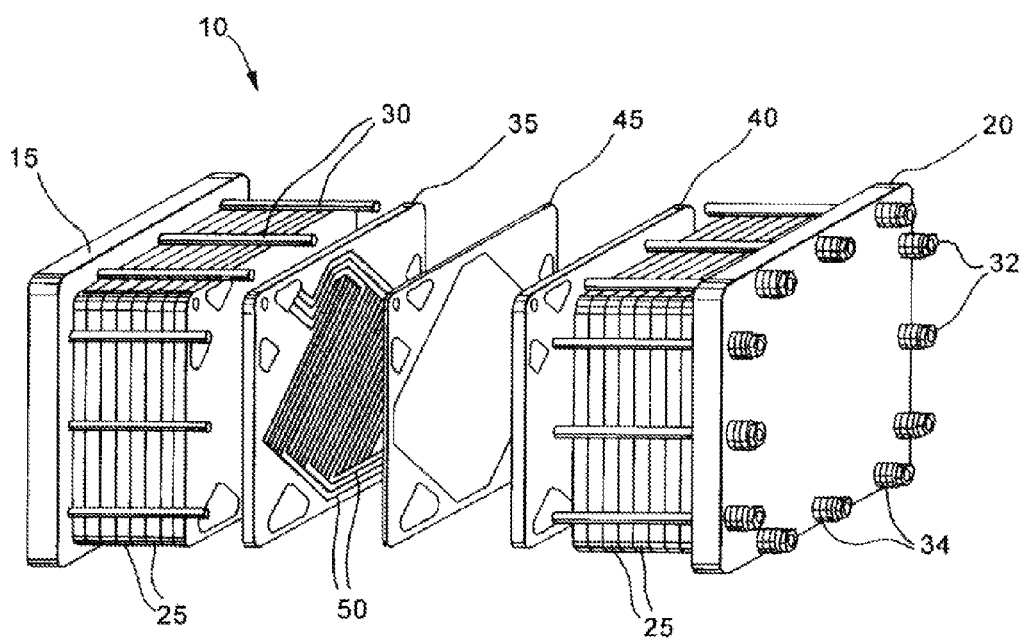
FIG. 1 is an exploded view of a conventional fuel cell stack (prior art)
Figure 2:
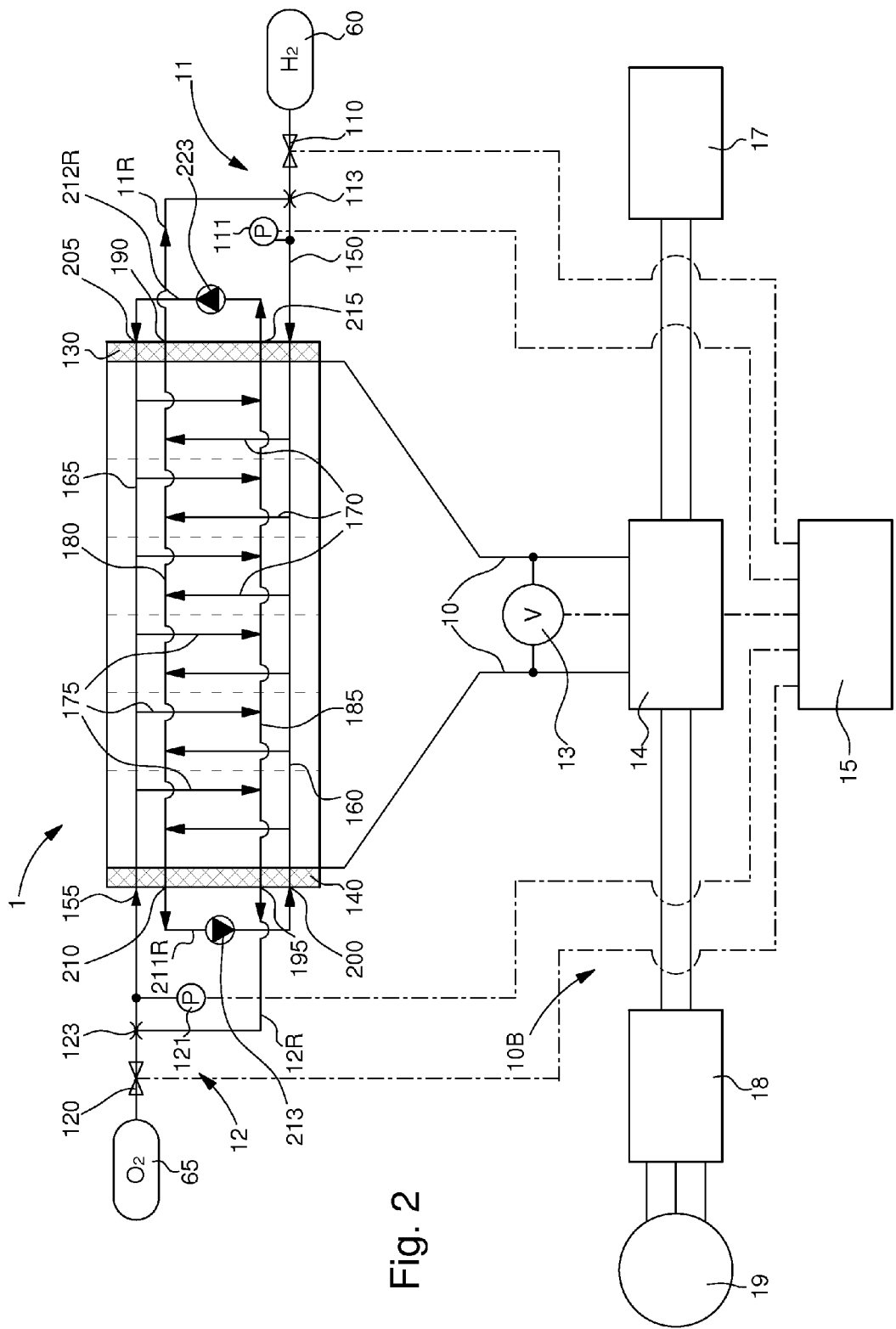
FIG. 2 is schematic representation of the power train of an automobile vehicle, the power train comprising an electric energy production system comprising a fuel cell stack supplied with pure hydrogen and oxygen.

The fuel cell stack 1 illustrated in FIG. 2 is of a type designed to use hydrogen as fuel and pure oxygen as oxidizer. It includes end plates 130, 140, a hydrogen inlet port 150 in end plate 130 and an oxygen inlet port 155 in end plate 140. Stack 1 further includes a hydrogen supply manifold 160 and an oxygen supply manifold 165 respectively for supplying a hydrogen stream and an oxygen stream to a plurality of individual fuel cells.

Hydrogen and oxygen flow fields associated with each fuel cell are represented by lines 170 and 175. A hydrogen exhaust manifold 180 and an oxygen exhaust manifold 185 remove the depleted reactants and the reaction products from the stack through a hydrogen outlet port 190 and an oxygen outlet port 195.

As illustrated, the fuel cell system comprises a pressurized hydrogen storage vessel 60 connected the hydrogen inlet 150 of the stack by means of a supply line equipped with a hydrogen supply valve 110 and an ejector pump 113. A hydrogen pressure sensor 111 is arranged on the supply line near the hydrogen inlet 150 so as to measure the pressure of the hydrogen supplied to the fuel cell stack 1. A first hydrogen recirculating line 11R connects outlet port 190 of the stack to the hydrogen supply line, downstream of supply valve 110. The ejector pump 113 provides for recirculating the leftover hydrogen and for mixing it with fresh hydrogen.

In a similar way, the fuel cell system comprises a pressurized oxygen storage vessel 65 connected the oxygen inlet 155 of the stack by means of a oxygen supply line equipped with a oxygen supply valve 120 and a vacuum ejector pump 123. An oxygen pressure sensor 121 is arranged on the supply line near the oxygen inlet 155 so as to measure the pressure of the oxygen supplied to the fuel cell stack 1. An oxygen recirculating line 12R connects outlet port 195 of the stack to the oxygen supply line, downstream of supply valve 120. The ejector pump 123 (or any appropriate type of vacuum pump) provides for recirculating and for mixing the used oxygen with fresh oxygen.

The stack of the fuel cell system illustrated in FIG. 2 further comprises an auxiliary hydrogen inlet 200 and an auxiliary hydrogen outlet 210 connected to each other by a second hydrogen recirculating line 211R. Line 211R is equipped with an auxiliary hydrogen pump 213 provided for supplementing ejector pump 113. The stack 1 also comprises an auxiliary oxygen inlet 205, an auxiliary oxygen outlet 215 and an auxiliary oxygen pump 223, arranged on a second oxygen recirculating line 212R. Auxiliary pump 223 is provided for supplementing ejector pump 123. As shown in FIG. 2, hydrogen storage vessel 60 and auxiliary pump 213 are arranged to feed hydrogen to the fuel cells through opposite ends of the hydrogen supply manifold 160 and, in a similar fashion, oxygen storage vessel 65 and auxiliary pump 223 are arranged to feed oxygen to the fuel cells through opposite ends of the oxygen supply manifold 165. This arrangement has the advantage of allowing to dispense with valves on recirculating lines 11R and 12R.

The fuel cell system further comprises moisture management means (not shown). As product water is formed on the cathode side of the fuel cells by the combination of hydrogen and oxygen ions, the product water must be drawn away from the cathode side of the fuel cells. In particular, in order to avoid flooding, the moisture management means usually comprise a gas-liquid separator arranged on the oxygen recirculating line 12R. A second gas-liquid separator is preferably also arranged on the hydrogen recirculating line 11R. At the same time, moisture must be provided to both the anode and the cathode side of the cells in amounts that will prevent the membrane drying out.

The stack 1 is connected to an electric power line 10 to which it delivers the electricity it generates. An electric load 10B is connected to power line 10. The current from the stack is delivered to a power management unit 14. Unit 14 is connected on the one hand to an electric traction module for an automobile vehicle, which consists essentially of a DC/AC converter 18 and an electric machine 19 mechanically coupled to a drive wheel or drive wheels (not shown) of the automobile vehicle. The electric power management unit 14 is also connected to an electrical energy storage device, preferably a Li-Ion battery pack or a Supercapacitor pack 17. In the illustrated example, a power management unit 14 is arranged between the stack 1 and the electrical energy storage device 17. However, it will be understood that alternatively the stack could be connected directly to the energy storage device. Indeed, the invention makes it possible to control the output voltage from the stack by simply adjusting the pressure of the reactant gases. In this way, the supply voltage can be adjusted to the needs of the electrical energy storage device without requiring a form of DC/DC transformer.

Accordingly, the stack 1 can supply electricity to the electric traction module 18, 19 or to the battery pack 17, or both. The battery pack can receive electrical energy and store it, or it can deliver electrical energy to the electric traction module 18, 19. As regards the latter, since the electric machine 19 is reversible, it can both consume electric energy, while propelling the vehicle, and generate electricity for charging the battery pack 17, while in the electric braking mode of the vehicle. The electric power management unit 14 regulates the circulation of power as a function of the position of an accelerator pedal of the vehicle (not shown) and as a function of conditions prevailing in the electricity supply system.

The fuel cell stack 1 is controlled by a control unit 15. Unit 15 receives information from the hydrogen pressure sensor 111 and the oxygen pressure sensor 121, as well as from a voltage measuring device 13 via the power management unit 14. According to the illustrated example, the voltage measuring device 13 measures the output voltage from the fuel cell stack 1 as a whole. Thus the measured output voltage amounts the sum of the contributions from all the individual fuel cells in the stack. As the fuel cells are all subjected to substantially the same operating conditions, they all produce approximately the same output voltage. Therefore, the measured output voltage of the stack can be used to calculate an estimated voltage for an individual fuel cell. However, it is also possible to measure the output voltages of the individual cells separately, or else to divide the individual cells of the stack into several groups, each having an output voltage.

The control unit 15 controls the pressure of both the hydrogen and the oxygen supplied to the fuel cell stack by adjusting the hydrogen and oxygen supply valves 110, 120 and, if necessary, by directly controlling the operation of the auxiliary recirculating pumps 213, 223. The process that allows control unit 15 to control the reactant pressure in the fuel cells will now be explained in detail. The reactants are consumed in the fuel cells at a rate corresponding to the amount of electric power supplied by the stack 1 to the connected load. When, in the absence of a change of load, control unit 15 adjusts one of the supply valves 110, 120 towards the open position, the supplied stream of hydrogen or of oxygen increases and exceeds the amount of hydrogen or of oxygen consumed in the fuel cells. This causes the pressure at the anode or the cathode of the fuel cells to increase also. In contrast, when control unit 15 adjusts one of the supply valves 110, 120 towards the closed position, the supplied stream of hydrogen or of oxygen decreases and ceases to be enough to compensate for the amount of hydrogen or of oxygen consumed in the fuel cells. This causes the pressure at the anode or the cathode of the fuel cells to decrease. As previously mentioned, according to the present invention the hydrogen and the oxygen supplied to the fuel cell are substantially pure hydrogen and substantially pure oxygen respectively. This feature allows the hydrogen and the oxygen present in the fuel cell to be almost entirely consumed. It is thus possible for the pressure at the cathode and at the anode of the fuel cell to decrease far bellow the external atmospheric pressure. The pressure can even go as low as 0.2 $bar_{absolute}$.

Care is taken that the hydrogen pressure is at least 70% of the oxygen pressure, preferably at least 100% of the oxygen pressure, so as not to induce in the fuel cells the condition known as "fuel starvation". Fuel starvation, if more than momentary, is known to deteriorate fuel cells. However, other operating conditions wherein the hydrogen pressure is less than 100% of the oxygen pressure can also be advantageous, in particular in the case when it is desirable to increase the water content of the membrane. Furthermore, in order to avoid the appearance of a large pressure difference between the anode and the cathode of the fuel cells, the hydrogen pressure is preferably adjusted to follow the oxygen pressure. At any rate, the hydrogen pressure is confined in a range between +/−30% of the oxygen pressure.

Figure 3A:
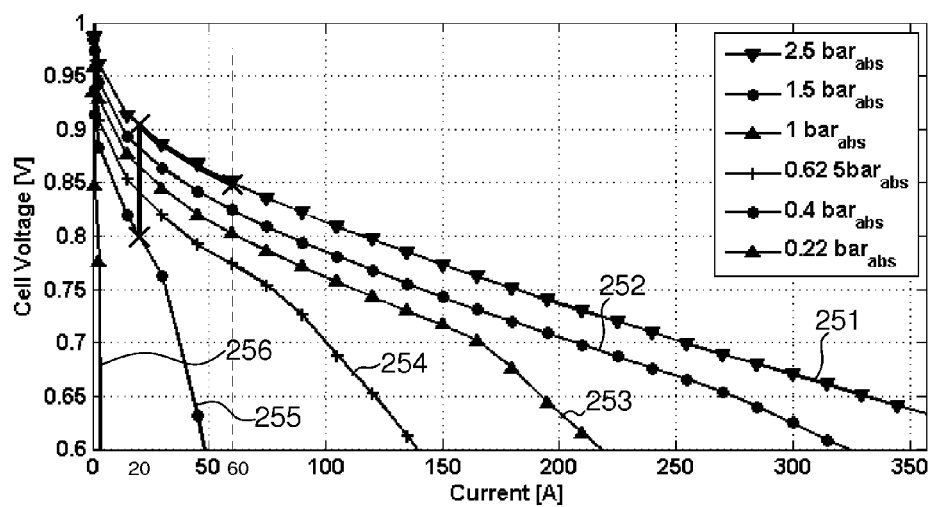
FIGS. 3A and 3B are diagrams respectively showing current/voltage curves and voltage/power curves for a polymer electrolyte fuel cell at different pressures.
Figure 3B:
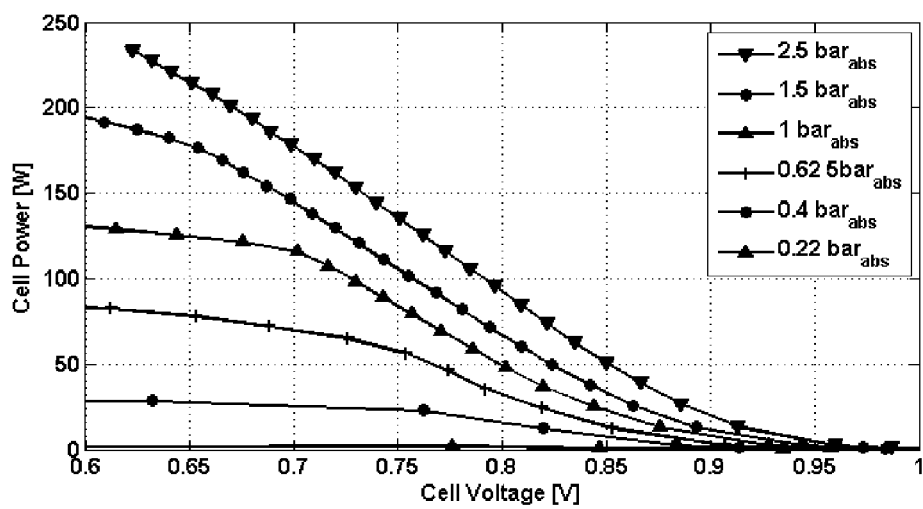

FIG. 3A is a diagram showing current/voltage curves (referenced 251 to 256) for a polymer electrolyte fuel cell operating at six different pressures (2.5 $bar_{abs}$, 1.5 $bar_{abs}$, 1 $bar_{abs}$, 0.62 $bar_{abs}$, 0.4 $bar_{abs}$, 0.22 $bar_{abs}$). One will observe that unsurprisingly, for any given pressure, the voltage decreases when the current increases, and vice versa. In particular, curve 251 shows that, when the pressure of the reactant gases is 2.5 $bar_{abs}$, the fuel cell needs to supply a current of approximately 60 amperes for the cell voltage to remain in a desirable range below 0.85 volts. If for some reason, the load current falls to 20 amperes for example, the cell voltage rises above 0.90 volt. Such a high cell voltage exceeds the limit beyond which higher degradation rates begin to be observed. However, curve 255 shows that, in such a situation, if the pressure inside the fuel cell is reduced from 2.5 $bar_{abs}$ to 0.4 $bar_{abs}$ for example, the cell voltage returns to a desirable level of approximately 0.8 volts. FIG. 3B shows similar voltage/power curves. It can be observed that at 0.85 volts output power is reduced by almost a factor 10 when the stack is operated at a pressure of 0.4 bar instead of 2.5 bar.

The control unit 15 is arranged to reduce the pressure of the reactant gases supplied to the fuel cell stack by partially or completely closing the hydrogen and oxygen supply valves 110, 120. However, if either of the supply valves 110 or 120 is entirely or nearly closed, the corresponding ejector pump 113 or 123 becomes useless, and the flow of used gas trough the recirculating line 11R or 12R comes to a standstill. In such a situation, the pressures in the supply (160 or 165) and the exhaust (180 or 185) manifolds tend to equalize, and the pressure drop needed for driving reactant gas along the flow fields 170 or 175 disappears. In order to allow the fuel cell stack to continue to operate even when the supply valve 110 or 120 is closed, control unit 15 turns on the corresponding auxiliary pump 213 or 223. When either of pumps 213 or 223 is operating, it reinjects leftover reactant gas present in the exhaust manifold 180 or 185 into the corresponding supply manifold 160 and 165. The use of auxiliary pumps 213 and 223 allows to maintain the necessary pressure difference between supply and exhaust manifolds. As already mentioned, hydrogen supply valve 110 and auxiliary pump 213 are arranged to control the flow of hydrogen into the supply manifold 160 through opposite ends thereof and, in a similar fashion, oxygen supply valve 120 and auxiliary pump 223 are arranged to control the flow of oxygen into the oxygen supply manifold 165 through opposite ends.

As described above, the fuel cell system in which the method of the present invention is implemented, comprises electronic controls, supply valves 110, 120 controlled by the control unit 15, pumps 213, 223, and a gas-liquid separator. The fuel cell system can also comprise cooling means using water pumps, as well as electrical heating means. All these elements and others form what are called auxiliaries. The auxiliaries of the fuel cell system need electricity to operate. Therefore, when the fuel cell system is working, the power demand is never zero, even when in an idling state (zero connected load operating conditions).

By controlling the reactant pressure in the fuel cells, it is possible to cope with low output load conditions while avoiding high cell voltage, even when no electrochemical energy storage unit is available to absorb the excess energy. Furthermore, by lowering the reactant pressure in the fuel cells substantially below 0.7 $bar_{absolute}$, it is even possible to reduce the amount of power supplied to no more than what is needed to power the auxiliaries. Therefore, the present invention makes it possible to dispense with shutting down the fuel cell system in zero output load operating conditions, even if no energy storage capacity is available.

It will be understood that various alterations and/or improvements evident to those skilled in the art could be made to the embodiment that forms the subject of this description without departing from the scope of the present invention defined by the annexed claims. In particular, instead of having the hydrogen main inlet 150 and the oxygen main inlet 155 on opposite sides of the stack, both main inlets could be on a first side of the stack. In this case, the auxiliary hydrogen pump 213 and the auxiliary oxygen pump 223 would be arranged together on the second side of the stack. An advantage of this arrangement would be that both auxiliary pumps could be actuated by the same motor.

The invention claimed is:

1. A method for limiting the output voltage of a PEM fuel cell system operating in an idling state in zero connected load conditions in such a way as to minimize degradation of performance over time, the PEM fuel cell system comprising an anode, a cathode, a controllable hydrogen recirculating pump, and a controllable oxygen recirculating pump, wherein the method comprises:
    (a) operating the PEM fuel cell system in zero connected load conditions;
    (b) supplying a stream of pure hydrogen to the anode of said fuel cell;
    (c) supplying an stream of pure oxygen to the cathode of said fuel cell;
    (d) monitoring an output voltage of the fuel cell;
    (e) monitoring a hydrogen pressure in the fuel cell;
    (f) monitoring an oxygen pressure in the fuel cell;
    (g) limiting the stream of hydrogen and the stream of oxygen and actuating the hydrogen and oxygen recirculating pumps in such a way as to bring and maintain the hydrogen and oxygen pressures below 0.7 $\text{bar}_{absolute}$ while maintaining said hydrogen pressure between 70 and 130% of said oxygen pressure, so that the output voltage remains between 0.65 and 0.90 volts, and the idling state is achieved.

2. The method of claim 1, wherein said method comprises adjusting said hydrogen stream and said oxygen stream in such a way that said output voltage remains between about 0.70 and 0.85 volts.

3. The method of claim 1, wherein said method further comprises maintaining said hydrogen pressure and said oxygen pressure between 0.2 and 0.7 $\text{bar}_{absolute}$.

4. The method of claim 3, wherein said method comprises maintaining said hydrogen pressure and said oxygen pressure between 0.5 and 0.7 $\text{bar}_{absolute}$.

5. The method according to claim 1, wherein the controllable recirculating pumps are diaphragm pumps.

6. The method according to claim 2, wherein the controllable recirculating pumps are diaphragm pumps.

7. The method according to claim 3, wherein the controllable recirculating pumps are diaphragm pumps.

8. The method according to claim 4, wherein the controllable recirculating pumps are diaphragm pumps.

9. The method of claim 2, wherein said method further comprises maintaining said hydrogen pressure and said oxygen pressure between 0.2 and 0.7 $\text{bar}_{absolute}$.

* * * * *